United States Patent [19]
Dumbrajs et al.

[11] Patent Number: 5,610,482
[45] Date of Patent: Mar. 11, 1997

[54] GYROTRON AND METHOD OF IMPROVING ITS EFFICIENCY

[75] Inventors: Olgierd Dumbrajs, Espoo, Finland; Arnold Möbius, Eggenstein-Leo., Germany

[73] Assignee: Forschungszentrum Karlsruhe GmbH, Karlsruhe, Germany

[21] Appl. No.: 398,653

[22] Filed: Mar. 3, 1995

Related U.S. Application Data

[63] Continuation-in-part of PCT/EP93/02783 Oct. 11, 1993.

[30] Foreign Application Priority Data

Oct. 27, 1992 [DE] Germany ............. 42 36 149.4

[51] Int. Cl.⁶ ............................................. H01J 25/00
[52] U.S. Cl. .................................. 315/500; 315/4
[58] Field of Search ........................ 315/500, 4, 5, 315/5.34, 5.35

[56] References Cited

U.S. PATENT DOCUMENTS

| | | | |
|---|---|---|---|
| 4,398,121 | 8/1983 | Chodorow et al. | 315/4 |
| 4,533,875 | 8/1985 | Lau et al. | 315/5.35 |
| 4,554,483 | 11/1985 | Baird et al. | 315/4 |
| 4,604,551 | 8/1986 | Moeller | 315/4 |
| 4,926,093 | 5/1990 | Sugawara | 315/4 |
| 4,988,956 | 1/1991 | Ono et al. | 315/3.35 |

FOREIGN PATENT DOCUMENTS

| | | |
|---|---|---|
| 2301903 | 9/1976 | France . |
| 3134582 | 6/1982 | Germany . |

*Primary Examiner*—Sandra L. O'Shea
*Assistant Examiner*—Vip Patel
*Attorney, Agent, or Firm*—Klaus Bach

[57] ABSTRACT

In a gyrotron comprising a cathode with an emitter ring, an accelerating anode, a resonator, a collector, and an uncoupling conduit, an arrangement is disposed around the resonator which generates a solenoidal static axial magnetic constant field which, in the area of the resonator, assumes a predetermined wave form causing the electrons emitted from the cathode to move along a spiral path and which has varying localized strengths such that the electrons passing therethrough along the spiral path have, upon exiting the resonator area, only an insignificant transverse velocity component left, whereupon they are attracted by the collector which is precharged.

7 Claims, 4 Drawing Sheets

GYROTRON AND METHOD OF IMPROVING ITS EFFICIENCY

This is a Continuation-in-Part application of international application PCT/EP93/02783 filed Oct. 11, 1993 claiming the priority of German application P 42 36 149.4 of Oct. 27, 1992.

BACKGROUND OF THE INVENTION

The invention resides in a gyrotron which comprises a cathode with an emitter ring, an acceleration anode, a resonator, an uncoupling conduit, a collector and also an arrangement for generating a solenoidal, static, axial, magnetic constant field.

Gyrotrons are high-powered microwave sources as they are needed for the heating of fission plasmas. Typically, their output power is about 1 MW and their frequency in the area of 100 GHz.

A basic gyrotron design is shown and described in Meinke-Gundlach "Taschenbuch der Hochfrequenztechnik" (publisher Springer, Berlin, Heidelberg, New York, Tokyo, 1986), pages 1982–1986. Particularly, high-power gyrotrons are considered suitable as supplemental heating devices for fission plasmas (see pages S17 and S18).

With magnetic fields, which are constant along the axes or which change in a highly monotonous or simply linear manner, the electric efficiency reached by gyrotrons is at this point 50%. At least for research application, an improvement of gyrotron efficiency is, therefore, not urgent at this time. However, the use of gyrotrons in the industry is of increasing interest so that their greater efficiency becomes economically important. Research in this direction has been performed by M. E. Read et al., and is described in IEEE Transactions Microwave Theory and Techniques, Vol. MTT-30, No. 1, January 1982 on pages 42 to 46 under the title "Experimental Examination of the Enhancement of Gyrotron Efficiencies by the Use of Profiled Magnetic Fields". The magnetic constant field in the resonator is increasing or decreasing in a highly monotonous manner, that is, it is linear. Such a field continuity is obtained by additional winding arrangements in the area of the resonator or by appropriately guiding the magnetic flux by means of iron structures.

In this manner, the efficiency of a gyrotron can be increased and this is achieved by transforming energy from the axial velocity component of the electrons, first into transverse energy of motion, which energy is subsequently extracted by the HF field. But, in this manner, a monoenergetically "consumed" beam is not generated.

It is the object of the present invention to provide a gyrotron with substantially increased overall efficiency that has an efficiency coefficient of close to 1 and to reduce the heat generated during the operation of the gyrotron to such a degree that little or no forced cooling is required during its operation.

SUMMARY OF THE INVENTION

In a gyrotron comprising a cathode with an emitter ring, an accelerating anode, a resonator, a collector, and an uncoupling conduit, an arrangement is disposed around the resonator which generates a solenoidal, static, axial, magnetic constant field which, in the area of the resonator, assumes a predetermined wave form causing the electrons emitted from the cathode to move along a spiral path and which has varying localized strengths such that the electrons passing therethrough along the spiral path have, upon exiting the resonator area, only an insignificant transverse velocity component left, whereupon they are attracted by the collector which is precharged.

In certain preferred embodiments such as with increased resonator length, the waveform of the constant field can be generated by an appropriately spatially wound solenoid with normal conductivity or superconductivity. For smaller resonator length, it is advantageous to provide permanent magnet layers with periodically varying field strength. For certain applications, it may be advantageous to provide a combined structure of electromagnets and permanent magnets.

This invention will be described in greater detail and explained on the basis of the accompanying drawings.

DESCRIPTION OF A PREFERRED EMBODIMENT

The efficiency of a gyrotron depends on a suitable selection of the electron cyclotron frequency in relation to the resonance frequency. Manufacturing tolerances can have a substantial impact on the resonance frequency and, accordingly, on the efficiency of a gyrotron. To avoid a mismatch between the electron - cyclotron - frequency and the resonance frequency of the gyrotron, the constant magnetic field varies slightly along the resonator axis.

Figure 1:
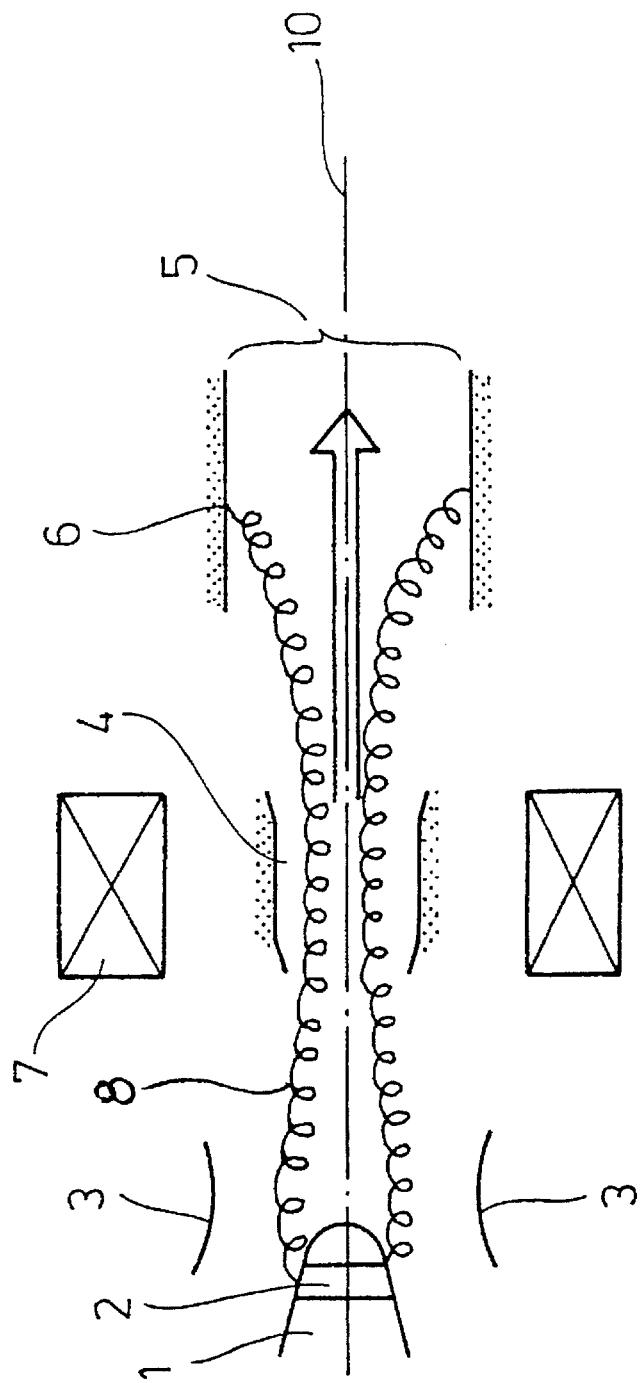
FIG. 1 shows schematically, the basic design of a gyrotron including the arrangement according to the invention tier generating the static waveform magnetic constant field.

In the gyrotron as shown in FIG. 1, the electrons progress along helix-shaped paths 8 guided by a static magnetic field 12 (FIG. 3) from an emitter ring 2 of a cathode 1 through an accelerator 3 to a resonator 4 and they leave the resonator 4 as "consumed" beam. "Consumed" means that the electron beam has transferred its transverse velocity energy to a large extent in the resonator 4. The consumed beam finally arrives at the collector 6 from where the heat generated thereby has to be removed and from which an uncoupling conduit 5 extends. The static magnetic field 11, 13 (FIG. 3) does not only serve to guide the electron beam but it also determines the cyclotron frequency for the electrons in the resonator 4 in accordance with the equation:

$$W_c = \frac{e * B}{m * j}$$

where
where m*j is the relativistic mass of the electrons with the elemental charge e.

The detuning between the electron cyclotron frequency and the resonance circuit frequency of the resonator 4 is essential for the reciprocal effect with which, depending on the entering phase, different amounts of energy are extracted from the transverse velocity components of the electrons. The extraction of the microwave energy occurs then either in the direction of the axis 10 of the gyrotron or normal to the gyrotron axis 10.

The ratio of the energy extracted from the transverse velocity component and the original energy in the transverse velocity component is called transverse efficiency $\eta_1$. The ratio of the transverse and the axial velocity components $\alpha$ is typically limited to values of 1.5 because of the cathode. Since no energy can be extracted from the axial component by the gyrotron mechanism the electrical efficiency $\eta_{el}$ is accordingly reduced:

$$\eta_{el} = \frac{a^2}{1+a^2} * \eta_1 \approx 0.7 * \eta_1.$$

The gyrotron efficiency can be increased by directing the beam onto a precharged collector 6. The level of the precharge compared to the potential which, on average, can be overcome by the electrons is the collector efficiency $\eta_c$. With a single stage precharged collector, the precharge must be smaller than the potential which corresponds to the energy of the slowest electron. The greater the straying of the energy distribution in the "consumed" beam, the lower is the efficiency of the collector 6. In presently operating gyrotrons with high transverse efficiencies ($\eta_1 \approx 0.7$), the straying of the energy distribution in the "consumed" beam is extremely high (see FIG. 4 dashed lines). With low efficiencies, the straying is smaller which, in both cases, provides for only low collector efficiencies.

The overall efficiency of a gyrotron with precharged collector 6 is calculated as:

$$\eta = \frac{\eta_{el}}{1 - \eta_c(1 - \eta_{el})}$$

Figure 2:
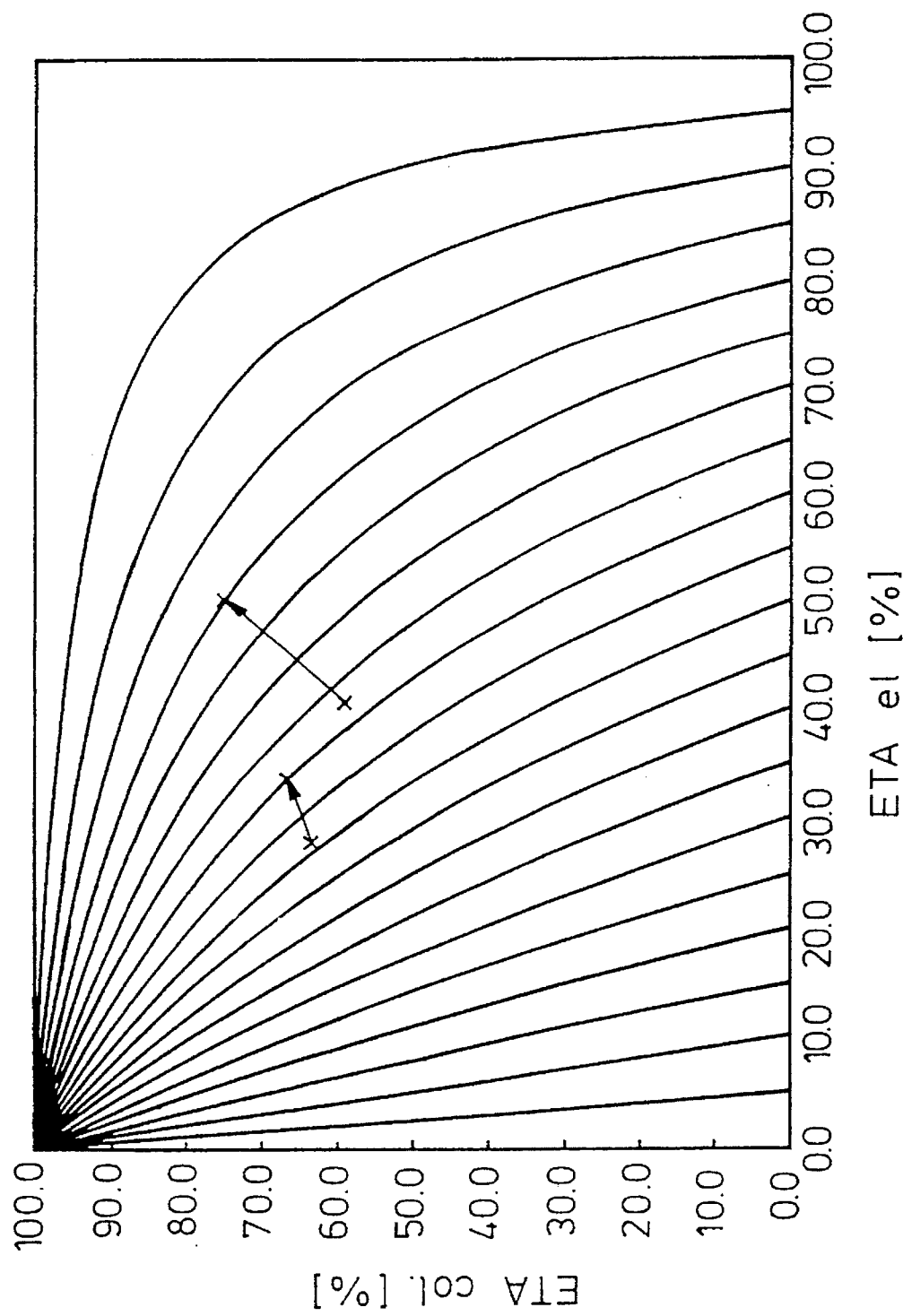
FIG. 2 is a diagram showing lines of constant overall efficiency.

FIG. 2 shows the curve family for respective constant overall efficiencies $\eta$ as a function of $\eta_c$, $\eta_{el}$.

In gyrotrons, as presently in operation, the transverse efficiency achievable with monotonous magnetic fields 11 which are essentially constant along the axis 10 is about $\eta_1 = 0.7$, from which, with $\alpha = 1.5$, it follows: $\eta_{el} = 0.5$.

The overall efficiency can be increased either by a multistage precharged collector or by generating a highly monoenergetic, "consumed" electron beam, by which $\eta_c$ will be increased or by increasing $\eta_1$. Both, a monoenergetic "consumed" electron beam and/or an increase of $\eta_1$, can be achieved if, in place of the constant magnetic field 11 with monotonous axial field strength charge as used so far (see FIG. 3 dashed line), a magnetic field 12 is generated in the resonator 4 (see FIG. 3, full line) which preferably has a slight wave form (preferably ≈3%) along the resonator axis 10. Such a magnetic field 12 can be generated for short-length resonators 4 more easily with permanent magnets 7 than with coils. The generation of a magnetic field with such wave shape is a possible task with the present state of the art, since such a field can be generated by arranging along the gyrotron axis 10 coils which are energized by different currents or coils with different numbers of windings. The depth of the waviness may vary along the resonator axis 10. The length of the various sections is preferably some 10% of the length of the resonator 4.

Figure 3:
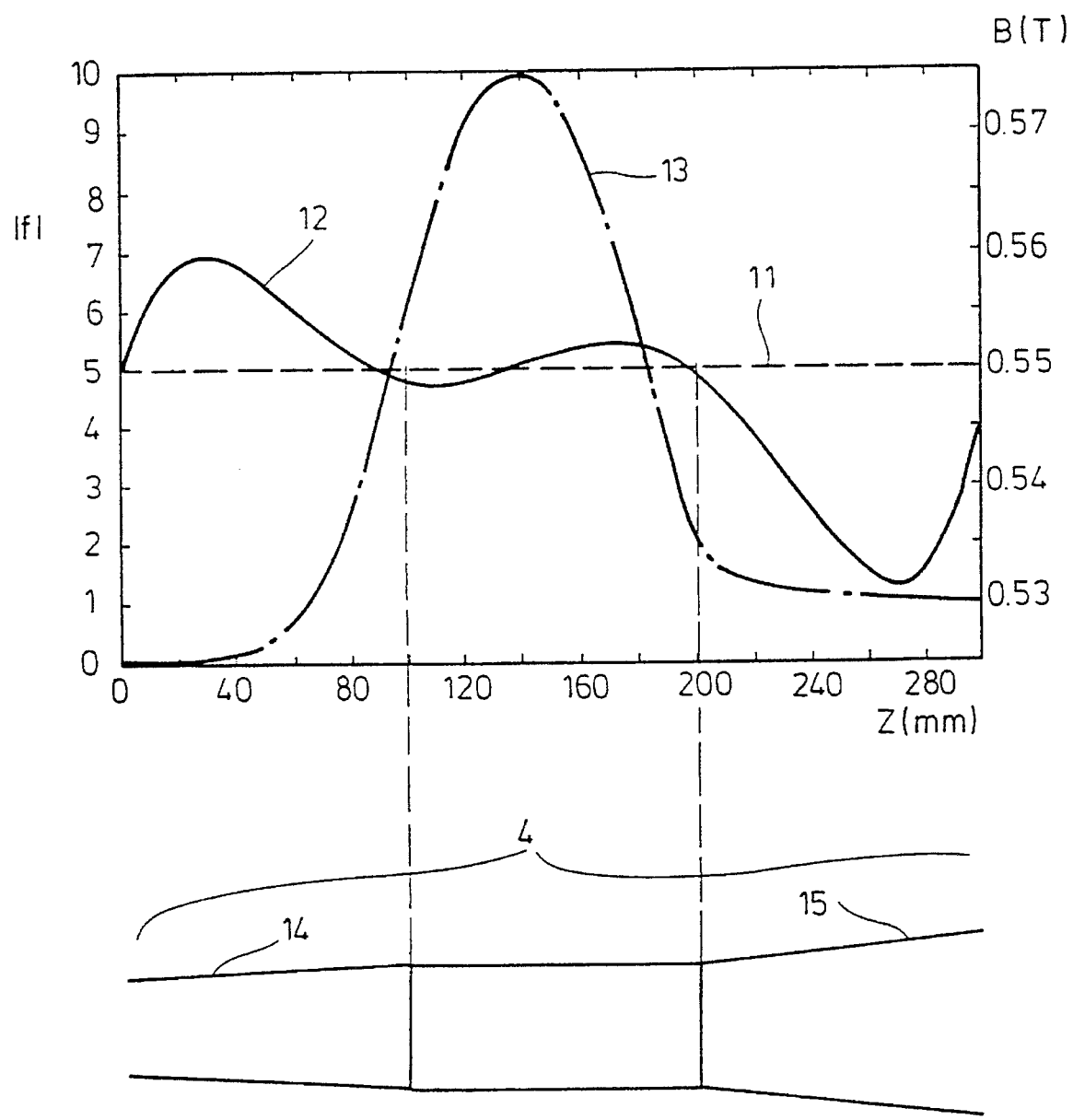
FIG. 3 is a representation of the magnetic field and the electric field over the resonator length and FIG. 4 shows the energy distribution of the electrons in the "consumed" electron beam.

FIG. 3 shows the field strength curves 11, 12 over the length of the resonator 4 from the left-hand conical area (taper 14) over the actual resonator to the right hand conical area (taper 15). The resonator 4 of the gyrotron is indicated in principle in the axial cross-sectional view of FIG. 1 and as indicated in the representation given in the lower portion of FIG. 3. It has been assumed in this manner for preliminary parameter studies. The dash-dotted line shows the electric field strength along the resonator 4.

Figure 4:
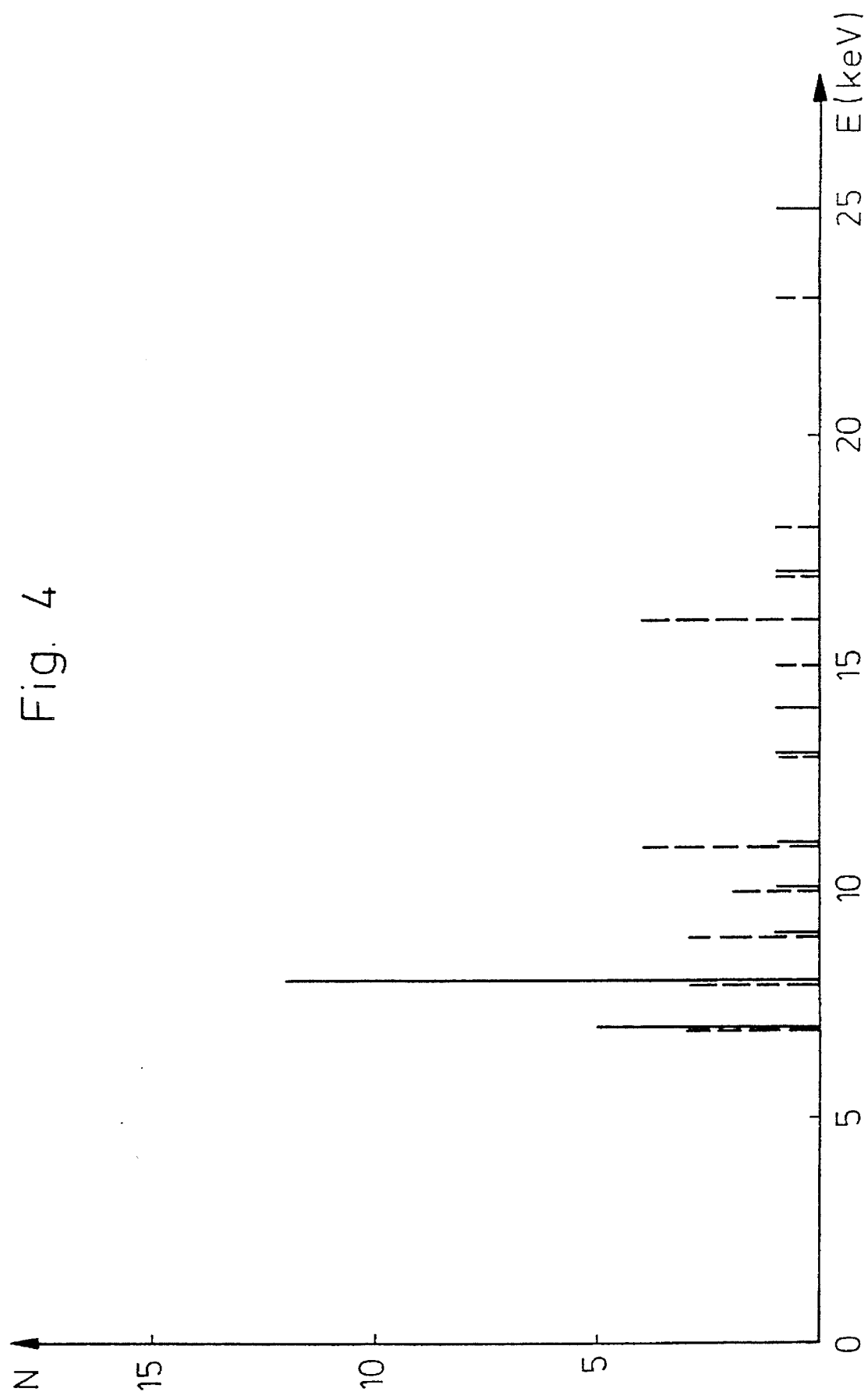

FIG. 4 shows the energy distribution of the electrons in the "consumed" beam, that is after the resonator 4 in the direction toward the collector 6. With the state-of-the-art method that is, with a constant magnetic field 11, the electrons of 7 to 16 keV are distributed relatively evenly. This is also readily apparent from the vertical efficiency $\eta_1 = 60\%$.

With the inhomogeneous, slightly wavy magnetic field 12, a substantial improvement is achieved. The energy distribution is almost fully concentrated on lines at 7 and 8 keV which increases the possible collector efficiency $\eta_c$ substantially; at the same time, the vertical efficiency $\eta_1$ was increased by 16%. Accordingly, the normal efficiency $\eta_1$, as well as the collector efficiency $\eta_c$ can be increased by providing a suitable inhomogeneous wavy magnetic field 12 within the resonator area 4 and applying a precharge to the collector 6 for attracting the "consumed" electron beam.

What is claimed is:

1. A method of increasing the efficiency of a gyrotron having a resonator and a collector, comprising the steps:

selecting a static, constant, homogeneous field for generating the spiral movement of the electrons in such a manner that the ratio of extracted transverse movement energy to the original transverse movement energy is the same or only slightly different for all electrons passing said resonator whereby the energy remaining in the beam can be recovered by said collector, superimposing on the constant magnetic field in the resonator area a magnetic field such that in said resonator area a constant magnetic field with a predetermined waveform is generated whereby the transverse movement energy is uncoupled from said beam such that an essentially monoenergetic electron beam is generated which after leaving said resonator has no or at most a non-essential transverse velocity component thereby avoiding mismatches of the magnetic field-dependent electron cyclotron frequency on the resonance frequency of the gyrotron resonator.

2. A gyrotron having an axis and comprising, arranged in alignment along its axis, a cathode with an emitter ring, an accelerating anode, a resonator, a collector, an uncoupling conduit and an arrangement extending around said resonator for generating a solenoidal, static axial magnetic field which causes the electrons emitted from said cathode to move along a spiral path and which, in the area of said resonator, imposes on said magnetic field a predetermined wave form, of a local strength such that the electrons passing therethrough along said spiral path have, upon exiting the resonator area, not more than an insignificant transverse velocity component, and said collector being precharged for attracting said electrons.

3. A gyrotron according to claim 2, wherein said arrangement for generating said wave form constant, magnetic field is an appropriately spatially wound solenoid.

4. A gyrotron according to claim 2, wherein said arrangement for generating said waveform constant magnetic field is an appropriately sandwiched permanent magnet.

5. A gyrotron according to claim 2, wherein said arrangement for generating said wave-form form constant magnetic field is a superconductive solenoid.

6. A gyrotron according to claim 2, wherein said arrangement for generating said waveform magnetic constant field comprises a permanent magnetic structure and solenoids.

7. A gyrotron according to claim 6, wherein said solenoids are superconductive solenoids.

\* \* \* \* \*